United States Patent
Vogel et al.

(10) Patent No.: US 7,665,058 B2
(45) Date of Patent: Feb. 16, 2010

(54) CUSTOMIZABLE DEVELOPMENT AND DEMONSTRATION PLATFORM FOR STRUCTURED ASICS

(75) Inventors: Danny Vogel, Sudbury, MA (US); Carl Shaw, Boca Raton, FL (US)

(73) Assignee: LSI Corporation, Milpitas, CA (US)

( * ) Notice: Subject to any disclaimer, the term of this patent is extended or adjusted under 35 U.S.C. 154(b) by 393 days.

(21) Appl. No.: 11/724,663

(22) Filed: Mar. 15, 2007

(65) Prior Publication Data

US 2007/0162886 A1 Jul. 12, 2007

Related U.S. Application Data

(62) Division of application No. 10/725,638, filed on Dec. 2, 2003, now Pat. No. 7,213,224.

(51) Int. Cl.
*G06F 17/50* (2006.01)
(52) U.S. Cl. ...................................................... 716/16
(58) Field of Classification Search ................... 716/16
See application file for complete search history.

(56) References Cited

U.S. PATENT DOCUMENTS

| | | | |
|---|---|---|---|
| 6,212,566 B1 * | 4/2001 | Vanhoof et al. ............. | 709/230 |
| 6,347,395 B1 * | 2/2002 | Payne et al. ................. | 716/18 |
| 6,694,462 B1 * | 2/2004 | Reiss et al. .................. | 714/724 |
| 2004/0068593 A1 * | 4/2004 | Helenic et al. ............... | 710/71 |
| 2004/0085955 A1 * | 5/2004 | Walter et al. ................ | 370/386 |
| 2004/0172494 A1 * | 9/2004 | Pettey et al. ................. | 710/305 |
| 2005/0022155 A1 * | 1/2005 | Broberg et al. .............. | 717/101 |

* cited by examiner

*Primary Examiner*—Stacy A Whitmore
(74) *Attorney, Agent, or Firm*—Suiter Swantz pc llo

(57) ABSTRACT

The present invention is directed to a customizable development and demonstration platform for structured ASICs. In an exemplary aspect of the present invention, the present platform may include a structured ASIC which is built on a slice and which may be flexible enough for a number of possible application developments. This flexibility may be achieved by incorporating a programmable processor in the structured ASIC and by defining interfaces and the use of an external FPGA in the present platform. The structured ASIC may include a complete ARM processor subsystem and a plurality of high speed SERDES ports. The processor subsystem may include a bus interface to the external FPGA, allowing custom gate development and test in the FPGA, prior to incorporating it into the customer product. Through the SERDES ports, the test block may be used to show the electrical characteristics of the SERDES IP. In addition, some SERDES ports may be driven from a link layer realized in the FPGA. This may allow the same chip and board to implement SATA (serial advanced technology attachment), GigE, XAUI, XGXS, Fiber Channel, and the like by changing the programming of the FPGA on the board.

12 Claims, 4 Drawing Sheets

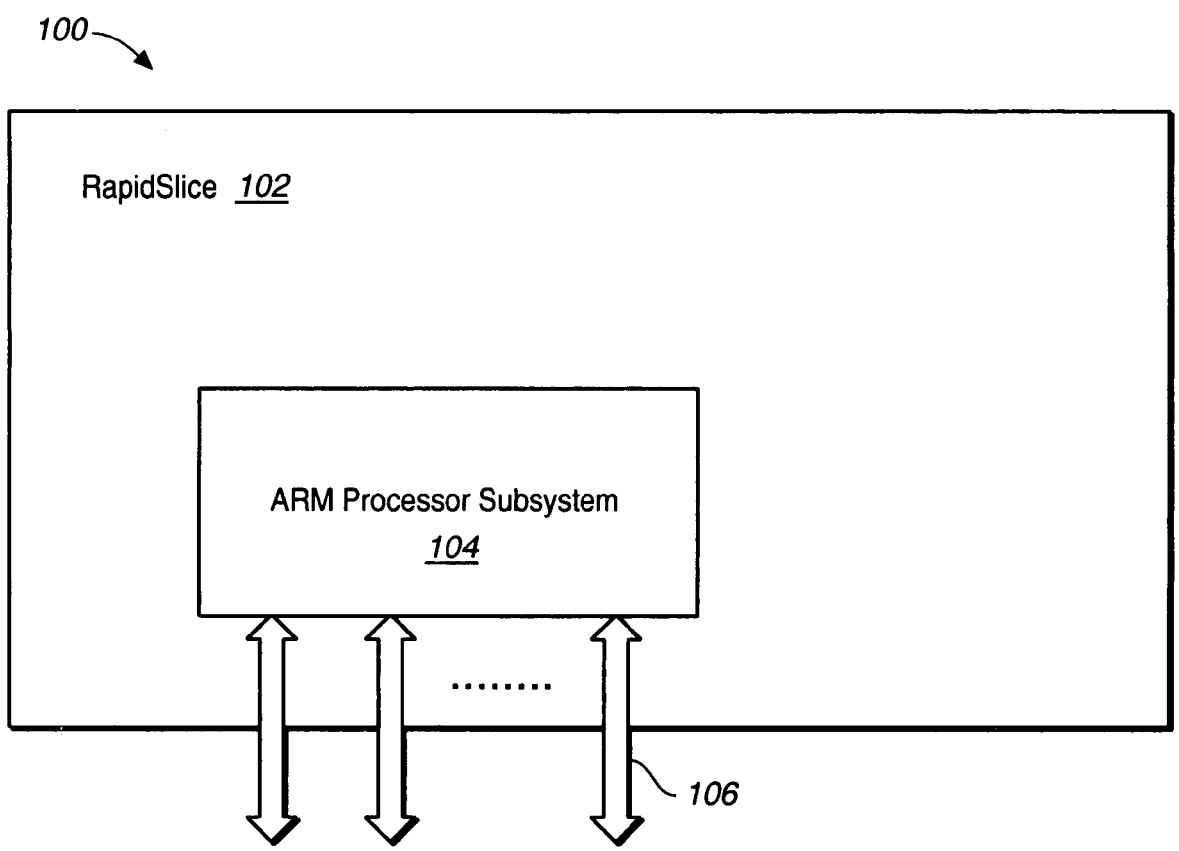
FIG._1

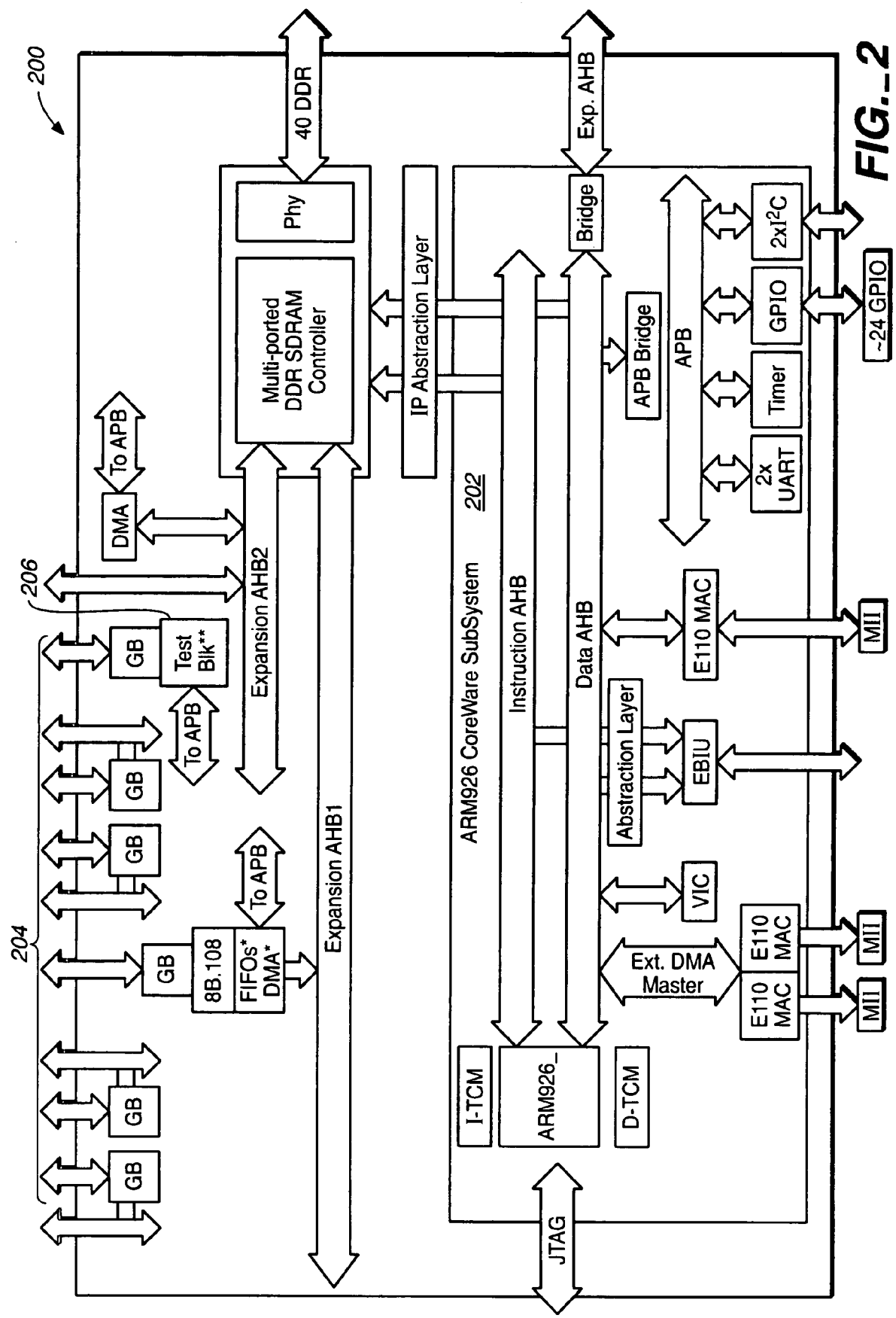
FIG._2

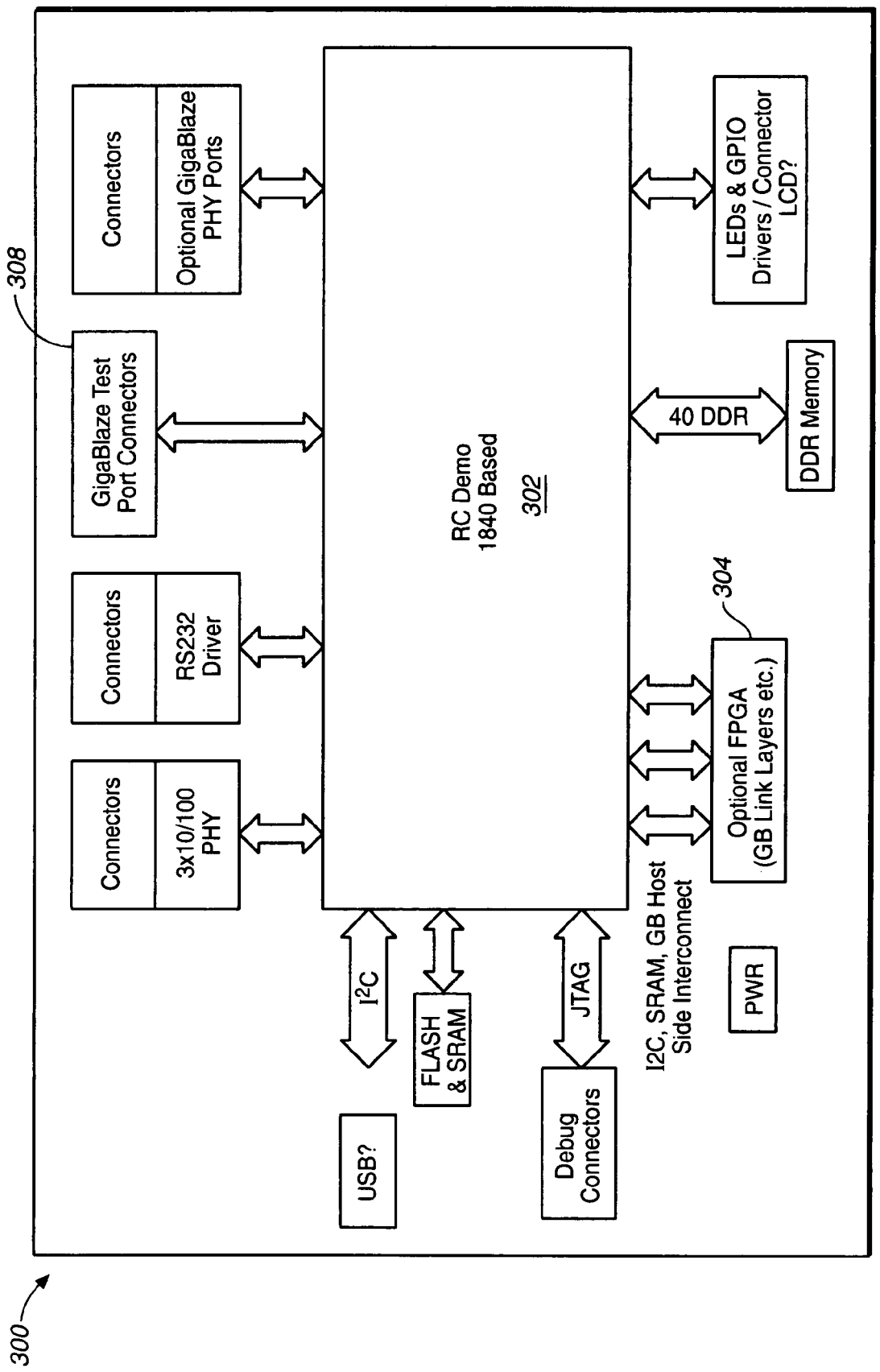
FIG._3

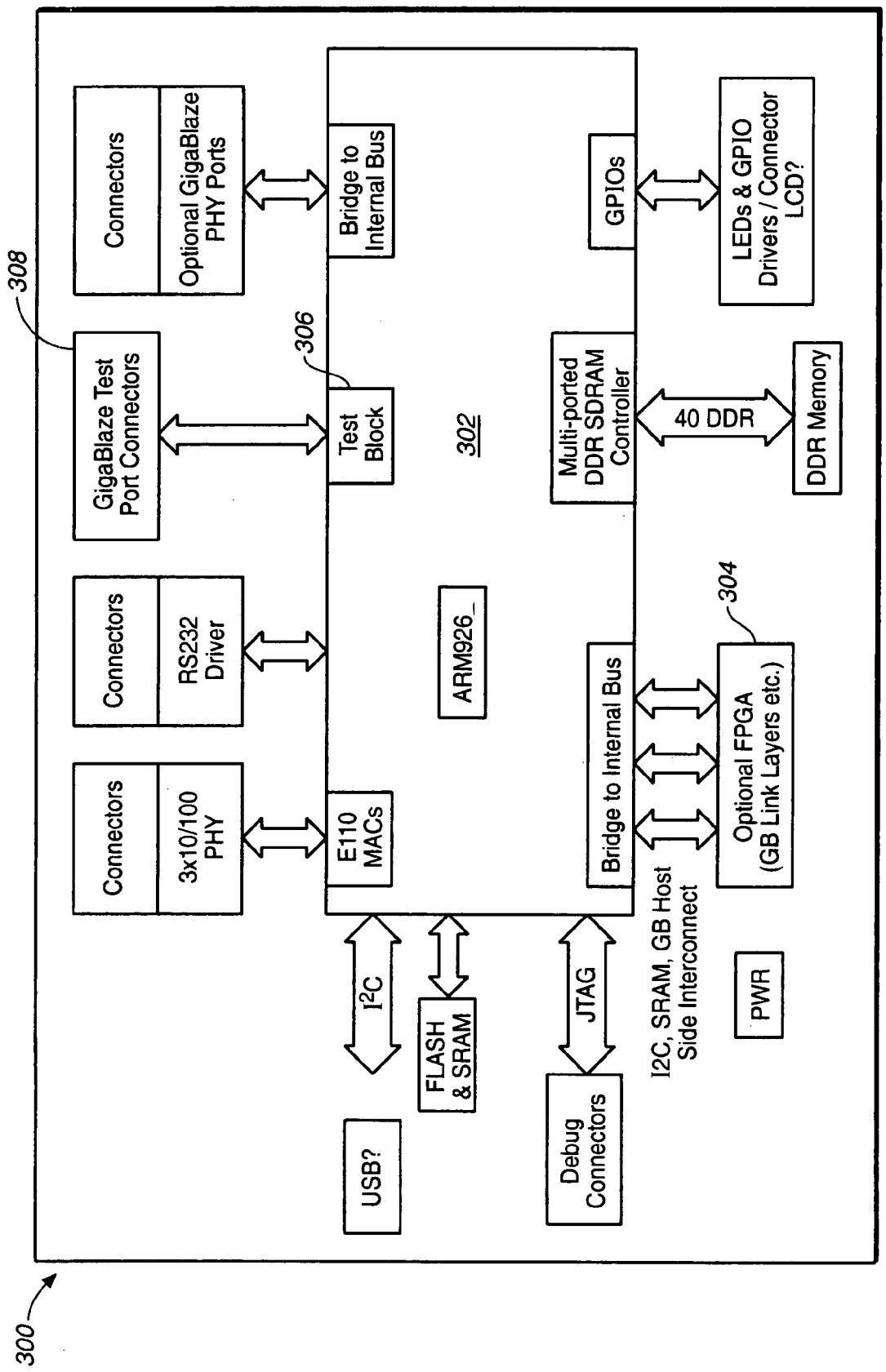
FIG._4

CUSTOMIZABLE DEVELOPMENT AND DEMONSTRATION PLATFORM FOR STRUCTURED ASICS

CROSS REFERENCE TO RELATED APPLICATIONS

The present application is a divisional application of U.S. patent application Ser. No. 10/725,638 filed on Dec. 2, 2003, now U.S. Pat. No. 7,213,224. U.S. patent application Ser. No. 10/725,638 is hereby incorporated by reference in its entirety.

FIELD OF THE INVENTION

The present invention relates generally to integrated circuits, and particularly to a customizable development and demonstration platform for structured ASICs.

BACKGROUND OF THE INVENTION

A structured ASIC (application specific integrated circuit) is a large-scale, high-complexity semiconductor device that includes one or more of the following elements: (1) memory; (2) a customizable array of transistors; (3) an IP (intellectual property) block; (4) a processor, e.g., an ESP (embedded standard product); (5) an embedded programmable logic block; and (6) interconnect. RapidChip™ developed by LSI Logic Corp. is an example of a structured ASIC.

Structured ASIC based IC design is a powerful concept for coping with the increased pressure on time-to-market, design and manufacturing costs. The basic idea behind structured ASIC based IC design is to avoid designing a chip from scratch. Some portion of the chip's architecture is predefined for a specific type of application. Through extensive design reuse, the structured ASIC based IC design may provide faster time-to-market and reduce design cost.

Under a structured ASIC approach, there may exist two distinct steps entailed in creating a final end-user product: a prefabrication step and a customization step. In a prefabrication step, a slice is built on a wafer. A slice is a pre-manufactured chip in which all silicon layers have been built, leaving the top metal layers to be completed with the customer's unique IP. For example, RapidSlice™ developed by LSI Logic Corp. is an example of a slice. One or more slices may be built on a single wafer. It is understood that a slice may include one or more bottom metal layers or may include no metal layers at all. In a preferred embodiment of the prefabrication step, the diffusion processes and the early-metal steps are carried out in a wafer fab. That is, the base characteristics, in terms of the IP, the processors, the memory, the interconnect, the programmable logic and the customizable transistor array, are all laid down and prediffused, and the early-metal components of the stack are manufactured. However, a slice is still fully decoupled because the customer has not yet introduced the function into the slice. In a customization step, metal layers (or late-metal components) are laid down, which couple the elements that make up the slice built in the wafer fab, and the customizable transistor array is configured and given its characteristic function.

Development of a structured ASIC often creates a need not only for a demonstration platform but also for a development and proof of concept platform. Because the variation in customer requirements may be significant, particularly in the software requirements and in the type and quantity of interfaces that require support, the cost in dollars and time of the platform should be minimized for marketability. Conventionally, a demonstration and development platform may involve the following methods: (1) software simulation (However, such a method may be custom developed per project and tends to execute very slowly. Moreover, there is no proof of actual hardware); (2) board based solutions using standard products (Such a method may prove out designs at or near speed. However, the board is seldom based on final hardware and often does not show the platform itself or its IP. Moreover, each board may be custom developed); and (3) standard product based upon a RapidSlice™ (This method may show the RapidSlice™ technology, but may not be adaptable to customer's proof of concept, development, or demonstration).

Thus, it would be desirable to provide a customizable development and demonstration platform, which may permit flexible use for a variety of development and demonstration needs, and may allow fast execution compared to software simulation and low cost compared to multiple custom developments. Such a platform may use the same technology and IP as used in the final, custom device and may have demo applications software readily available at relatively low cost and engineering effort.

SUMMARY OF THE INVENTION

Accordingly, the present invention is directed to a customizable development and demonstration platform for structured ASICs. In an exemplary aspect of the present invention, a customizable development and demonstration platform for structured ASICs may include a structured ASIC which is built on a slice and which may be flexible enough for a number of possible application developments. For example, a structured ASIC may be a RapidChip™, and a slice may be a RapidSlice™. This flexibility may be achieved by incorporating a programmable processor in the structured ASIC and by defining interfaces and the use of an external Field Programmable Gate Array (FPGA) in the present platform. The structured ASIC may include a complete ARM processor subsystem and a plurality of high speed SERDES (serializer-deserializer) ports. The processor subsystem may include a bus interface to the external FPGA, allowing custom gate development and test in the FPGA, prior to incorporating it into the customer product. The number of the plurality of high speed SERDES ports 106 may be eight. The eight high speed SERDES ports may be used as follows: 1 port is driven by test circuitry or test block to more readily run signal integrity tests, 4 ports are pinned out to be driven by the external FPGA, 1 port may be connected to a DMA (Direct Memory Access) device allowing flexible pattern transmission, and the remaining ports are not utilized. Through the SERDES ports, the test block may be used to show the electrical characteristics of the SERDES IP (intellectual property). In addition, the 4 SERDES ports may be driven from a link layer realized in the FPGA. This may allow the same chip and board to implement SATA (serial advanced technology attachment), GigE (Gigabit Ethernet), XAUI (10 Gigabit Attachment Unit Interface), XGXS (10 Gigabit Ethernet Extended Sublayer), Fibre Channel, and the like by changing the programming of the FPGA on the board (with far less expense than separate chip/board developments, while retaining the use of the IP to be used in the final design). Thus, the key electrical properties may be shown and worked with, the applications variations may be supported and modified readily at the link layer, and the software stacks and applications may be modified by the customer in software. Additional external I/Os may be supported through low speed serial interfaces ($I^2C$, i.e., inter-IC) or 10/100 Ethernet ports on the structured ASIC.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 shows a schematic block diagram illustrating an exemplary RapidChip™ in accordance with an exemplary embodiment of the present invention;

FIG. 2 shows an exemplary RapidChip™ including an ARM926 processor subsystem in accordance with an exemplary embodiment of the present invention;

FIG. 3 shows an exemplary demo board based on a RapidSlice™ 1840 and an ARM926 processor subsystem in accordance with an exemplary embodiment of the present invention; and FIG. 4 shows the demo board shown in FIG. 3, where the ARM926 processor subsystem is shown in further detail in accordance with an exemplary embodiment of the present invention.

DETAILED DESCRIPTION OF THE INVENTION

Reference will now be made in detail to the presently preferred embodiments of the invention, examples of which are illustrated in the accompanying drawings.

Referring first to FIG. 1, a schematic block diagram illustrating an exemplary RapidChip™ 100 in accordance with an exemplary embodiment of the present invention is shown. The RapidChip™ 100 may be part of a customizable development and demonstration platform (e.g., a demo board, and the like) in accordance with the present invention. It is understood that other structured ASICs may be used in the present invention without departing from the scope and spirit of the present invention. The RapidChip™ 100 may be built on a RapidSlice™ 102 and may be flexible enough for a number of possible application developments. This flexibility may be achieved by incorporating a programmable processor in the RapidChip™ 100 and by defining interfaces and the use of an external Field Programmable Gate Array (FPGA) (not shown) in the present platform. The RapidChip™ 100 may include a complete ARM processor subsystem 104 and a plurality of high speed SERDES (serializer-deserializer) ports 106. The processor subsystem 104 may include a bus interface (not shown) to the external FPGA, allowing custom gate development and test in the FPGA, prior to incorporating it into the customer product. In a preferred embodiment, the number of the plurality of high speed SERDES ports 106 is eight. The eight high speed SERDES ports may be used as follows: 1 port is driven by test circuitry or test block to more readily run signal integrity tests, 4 ports are pinned out to be driven by the external FPGA, 1 port may be connected to a DMA (Direct Memory Access) device allowing flexible pattern transmission, and the remaining ports are not utilized. Through the SERDES ports 106, the test block may be used to show the electrical characteristics of the SERDES IP (intellectual property). In addition, the 4 SERDES ports may be driven from a link layer realized in the FPGA. This may allow the same chip and board to implement SATA (serial advanced technology attachment), GigE (Gigabit Ethernet), XAUI (10 Gigabit Attachment Unit Interface), XGXS (10 Gigabit Ethernet Extended Sublayer), Fibre Channel, and the like by changing the programming of the FPGA on the board (with far less expense than separate chip/board developments, while retaining the use of the IP to be used in the final design). Thus, the key electrical properties may be shown and worked with, the applications variations may be supported and modified readily at the link layer, and the software stacks and applications may be modified by the customer in software. Additional external I/Os may be supported through low speed serial interfaces ($I^2C$, i.e., inter-IC) or 10/100 Ethernet ports on the RapidChip™ 100.

It is understood that from a demonstration vehicle perspective, the distribution software in the form of open source RTOS (real-time operating system) and router applications may exist, which may be readily ported to the present platform for demonstration use.

In an additional embodiment, no FPGA may be included in the present platform. Thus, the present platform may be a pure router/switch demonstration vehicle. The customer may start with switch application software and modify it to implement a customer switch, load balancer, firewall, and the like.

In another embodiment, the FPGA in the present platform may be used to implement a PCI Express interface connected to the SERDES ports 106 on the RapidChip™ 100 to develop a PCI Express endpoint vehicle. Similarly, SATA, XAUI, GigE, and the like may be implemented instead of PCI Express.

In a further embodiment, the FPGA in the present platform may be used to implement special function customer logic to prove a concept. An example might be encryption co-processor logic in the FPGA to secure communications between the Ethernet Ports on the customer ASIC. The co-processor logic may be tested in the FPGA and the complete system prototyped on the present platform.

FIG. 2 shows an exemplary RapidChip™ 200 built on an ARM926 processor subsystem in accordance with an exemplary embodiment of the present invention. The RapidChip™ 200 may be included in the present platform in accordance with an exemplary embodiment of the present invention. As shown, the RapidChip™ 200 may include an ARM 926 Coreware subsystem 202, a plurality of SERDES ports 204 such as GigaBlaze (GB) ports and the like, and a test block 206. Through the SERDES ports 204, the test block 206 may be used to show the electrical characteristics of the SERDES IP.

FIG. 3 shows an exemplary demo board 300 based on a RapidSlice™ 1840 and an ARM926 processor subsystem in accordance with an exemplary embodiment of the present invention, and FIG. 4 shows the demo board 300 shown in FIG. 3, where the ARM926 processor subsystem is shown in further detail in accordance with an exemplary embodiment of the present invention. The demo board 300 is a customizable development and demonstration platform for structured ASICs in accordance with an exemplary embodiment of the present invention. As shown, the platform 300 may include a RapidChip™ 302 communicatively coupled to a FPGA 304. RapidChip™ 302 may be the RapidChip™ 100 shown in FIG. 1, RapidChip™ 200 shown in FIG. 2, or the like. A test block 306 in the RapidChip™ 302 may be communicatively coupled to SERDES ports 308 such as GigaBlaze ports and the like to show the electrical characteristics of the SERDES IP. Some of the SERDES ports in the RapidChip™ 302 may be driven from a link layer realized in the FPGA 304.

It is understood that even though FIGS. 2, 3, and 4 show an ARM926 processor subsystem and/or a RapidSlice™ 1840, other programmable processor systems and/or other Rapid- Slice™ and/or other slices may be included in the present platform without departing from the scope and spirit of the present invention.

The present platform may have the following advantages. First, the present platform may permit flexible use for a variety of developments and demonstration needs (e.g., multiple interfaces, multiple applications, expandable to co-processor architectures via FPGA, and the like). Moreover, the present platform may have fast execution compared to software simulation. In addition, the technology and IP used in the present platform may be the same as the final, custom device, thus both may work the same way (or very close as compared to simulation and standard product platforms). Furthermore, the present platform may have low cost compared to multiple custom developments. Additionally, demo applications software may be readily available (relatively) at low cost (engineering effort) for the present platform.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A customizable development and demonstration platform for structured ASICs, comprising:
   a structured ASIC built on a slice, including a programmable processor and a plurality of high speed SERDES ports; and
   a FPGA communicatively coupled to said structured ASIC;
   wherein one of said plurality of high speed SERDES ports is driven by a test block in said structured ASIC to run signal integrity tests and when said platform is for demonstration use, distribution software in the form of open source RTOS and router applications are ported to said platform.

2. The platform of claim 1, wherein at least one of said a plurality of high speed SERDES port is pinned out to be driven by said FPGA.

3. The platform of claim 2, wherein said at least one of said a plurality of high speed SERDES port is driven from a link layer realized in said FPGA.

4. The platform of claim 3, wherein said platform implements at least one of SATA, GigE, XAUI, XGXS, and Fibre Channel.

5. The platform of claim 1, wherein the number of said a plurality of high speed SERDES ports is eight.

6. The platform of claim 1, wherein said a plurality of high speed SERDES ports are GigaBlaze ports.

7. The platform of claim 1, wherein a second port of said a plurality of high speed SERDES ports is connected to a direct memory device in said structured ASIC for allowing flexible pattern transmission.

8. The platform of claim 1, wherein said FPGA is used to implement a PCI Express interface to develop a PCI Express endpoint vehicle.

9. The platform of claim 1, wherein said programmable processor is an ARM processor.

10. The platform of claim 1, wherein said structured ASIC further comprises at least one of low speed serial interface and 10/100 Ethernet port, through which external I/Os are supported.

11. The platform of claim 1, wherein said test block is used to show electrical characteristics of intellectual property of said a plurality of high speed SERDES ports.

12. The platform of claim 1, wherein said structured ASIC is a RapidChip™ and said slice is a RapidSlice™.

* * * * *